United States Patent
Green, Jr. et al.

(10) Patent No.: US 6,364,353 B2
(45) Date of Patent: *Apr. 2, 2002

(54) DUAL STAGE AIR BAG INFLATOR

(75) Inventors: Lloyd G. Green, Jr.; Bradley W. Nelson; Robert E. Scott, all of Mesa; Jess A. Cuevas, Scottsdale; Thomas H. Deming, Mesa, all of AZ (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,770

(22) Filed: Jun. 7, 1999

(51) Int. Cl.⁷ .............................................. B60R 21/26
(52) U.S. Cl. ...................................... 280/736; 280/742
(58) Field of Search ................................ 280/736, 740, 280/741, 742; 102/530, 531

(56) References Cited

U.S. PATENT DOCUMENTS

| | | | | |
|---|---|---|---|---|
| 3,986,456 A | * | 10/1976 | Doin et al. | 102/531 |
| 4,017,100 A | * | 4/1977 | Gehrig et al. | 280/736 |
| 5,236,675 A | | 8/1993 | Swain et al. | |
| 5,564,742 A | * | 10/1996 | Clark et al. | 280/740 |
| 5,984,352 A | * | 11/1999 | Green, Jr. et al. | 280/736 |
| 6,019,389 A | | 2/2000 | Burgi et al. | |
| 6,032,979 A | | 3/2000 | Mossi et al. | |
| 6,106,002 A | * | 8/2000 | Haesaert et al. | 280/736 |
| 6,142,515 A | * | 11/2000 | Mika | 280/736 |

FOREIGN PATENT DOCUMENTS

WO    9425315    11/1994

OTHER PUBLICATIONS

TRW Chrysler KJ Presentation, Raynoso, "ADI9.0/9.2 Driver Inflator", Jan. 28, 1997.

TRW Vehicle Safety Systems Inc., GM Presourcing Presentation, "TRW Driver Inflator ADI9.0/ADI9.2", Dec. 8, 1997.

* cited by examiner

Primary Examiner—Paul N. Dickson
(74) Attorney, Agent, or Firm—Tarolli, Sundheim, Covell, Tummino & Szabo L.L.P.

(57) ABSTRACT

An inflator (10) comprises a housing (20) defining first and second combustion chambers (100, 120). A first inflation fluid source (140) in the first combustion chamber (100) is actuatable to effect flow of inflation fluid. A first initiator (112) in the housing (20), when energized, effects actuation of the first inflation fluid source (140). A second inflation fluid source (150) in the second combustion chamber (120) is actuatable to effect flow of inflation fluid. A second initiator (124) in the housing (20), when energized, effects actuation of the second inflation fluid source (150). The housing (20) deforms due to the pressure of inflation fluid in the housing upon actuation of one or both of the inflation fluid sources (140, 150). The housing (20), after deforming, has a fluid passage (90) for directing flow of inflation fluid out of the housing. The flow area of the fluid passage (90) varies in accordance with the pressure of inflation fluid in the housing (20). The housing comprises first and second housing parts (40, 30) having a first condition in abutting engagement with each other and a second condition, after deformation of the housing (20), spaced apart from each other to define the fluid passage (90). The first housing part (40) comprises a one-piece metal member that supports the initiators (112, 124) and defines the combustion chambers (100, 120).

12 Claims, 5 Drawing Sheets

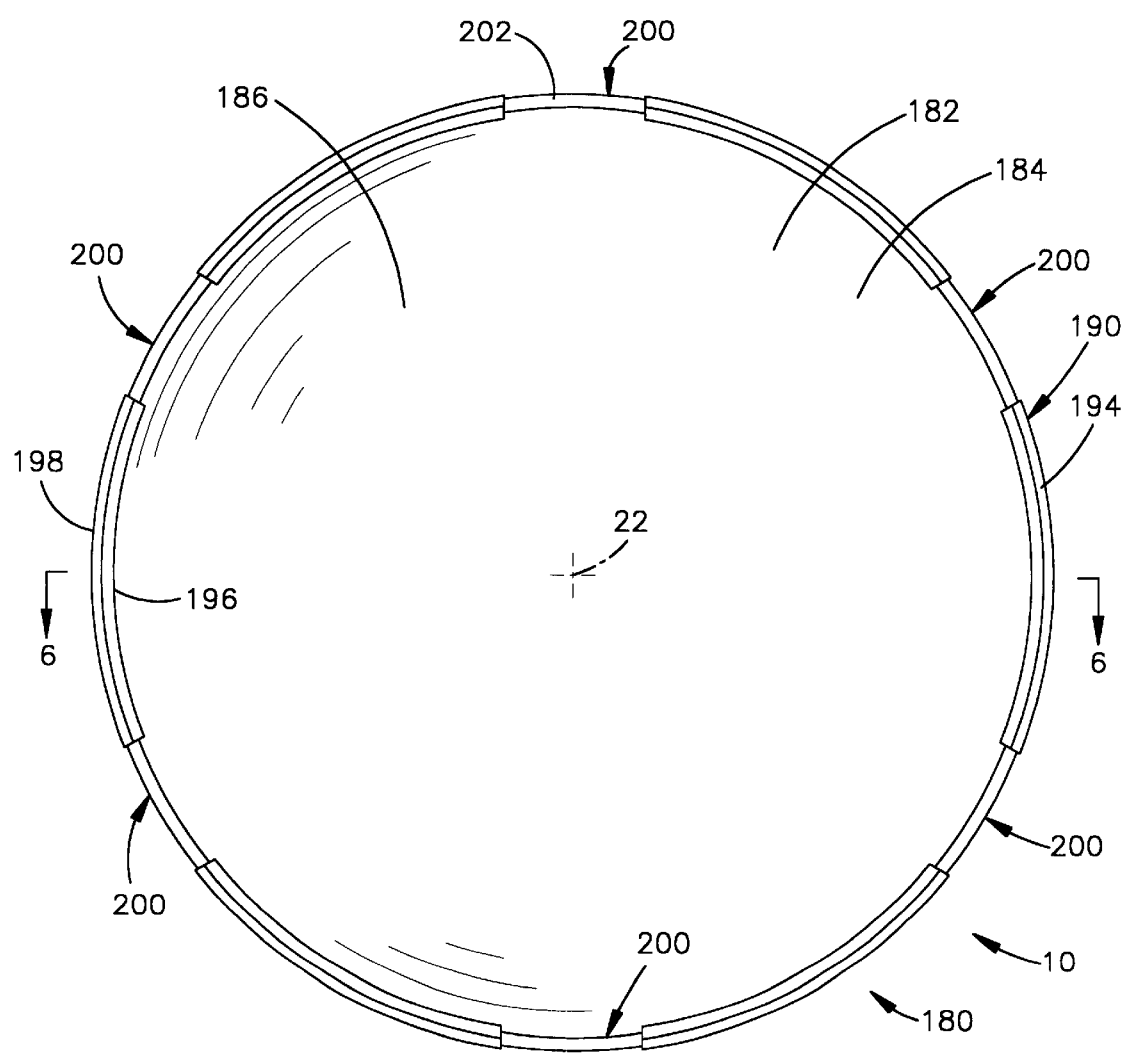
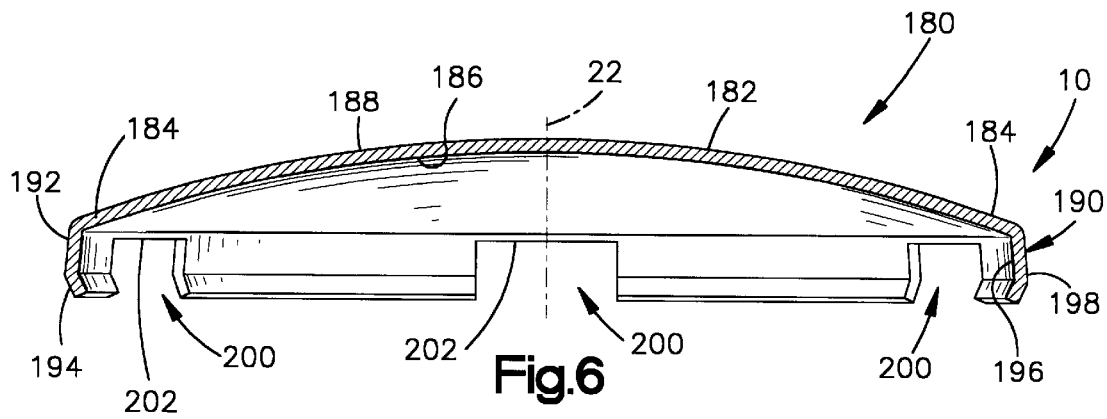

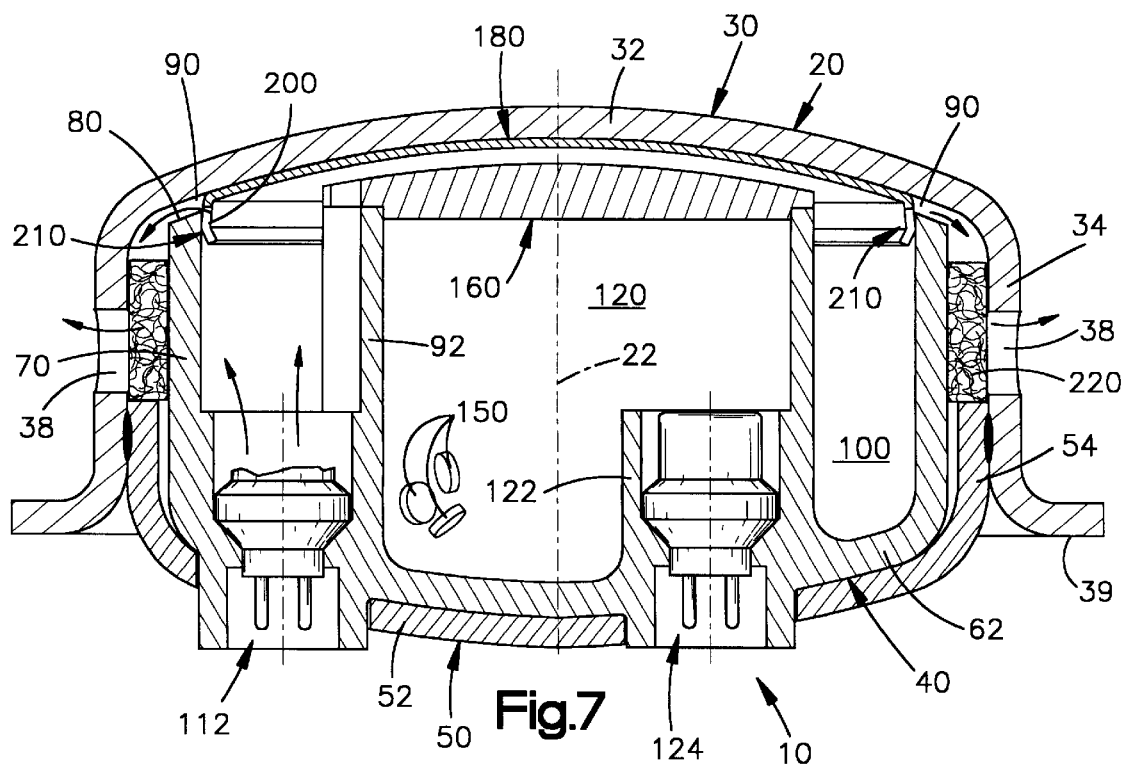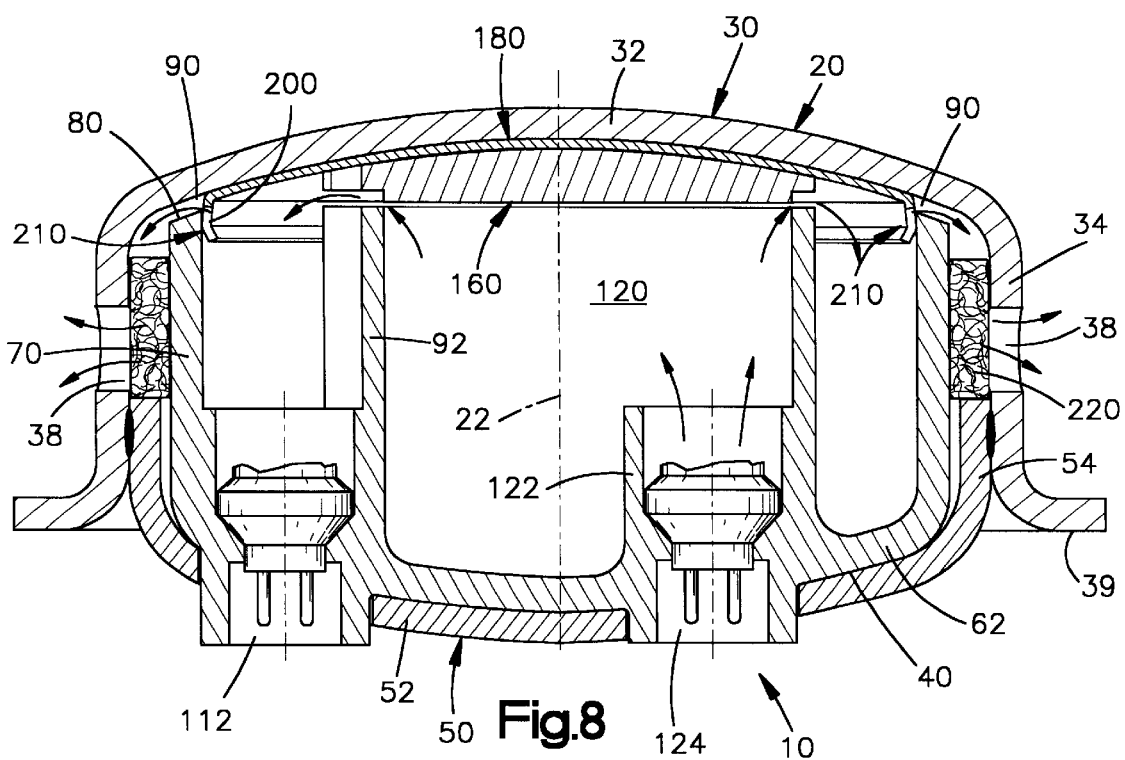

DUAL STAGE AIR BAG INFLATOR

BACKGROUND OF THE INVENTION

1. Technical Field

The present invention relates to an apparatus for inflating an inflatable vehicle occupant protection device.

2. Description of the Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an inflator for providing inflation fluid for inflating an inflatable vehicle occupant protection device. The inflator comprises a housing defining first and second combustion chambers. A first inflation fluid source in the first combustion chamber is actuatable to effect flow of inflation fluid to inflate the inflatable device. The inflator includes a first initiator in the housing for, when energized, effecting actuation of the first inflation fluid source. A second inflation fluid source in the second combustion chamber is actuatable to effect flow of inflation fluid to inflate the inflatable device. The inflator includes a second initiator in the housing for, when energized, effecting actuation of the second inflation fluid source.

The housing deforms due to the pressure of inflation fluid in the housing upon actuation of one or both of the inflation fluid sources. The housing, after deforming, has a fluid passage for directing flow of inflation fluid out of the housing to the inflatable device. The flow area of the fluid passage varies in accordance with the pressure of inflation fluid in the housing. The housing comprises first and second housing parts having a first condition in abutting engagement with each other and a second condition, after deformation of the housing, spaced apart from each other to define the fluid passage. The first housing part comprises a one-piece metal member that supports the first and second initiators and defines the combustion chambers.

BRIEF DESCRIPTION OF THE DRAWINGS

Further features of the present invention will become apparent to those skilled in the art to which the present invention relates from reading the following description with reference to the accompanying drawings, in which:

FIG. 5 is a bottom plan view of a threshold cap which forms part of the inflator of FIG. 1;

FIG. 6 is a sectional view of the threshold cap taken along line 6—6 of FIG. 5;

FIG. 7 is a view similar to FIG. 2, showing the inflator in a first actuated condition in which only a first stage of the inflator is actuated; and FIG. 8 is a view similar to FIG. 2, showing the inflator in a second actuated condition in which both first and second stages of the inflator are actuated.

DESCRIPTION OF A PREFERRED EMBODIMENT

Figure 1:
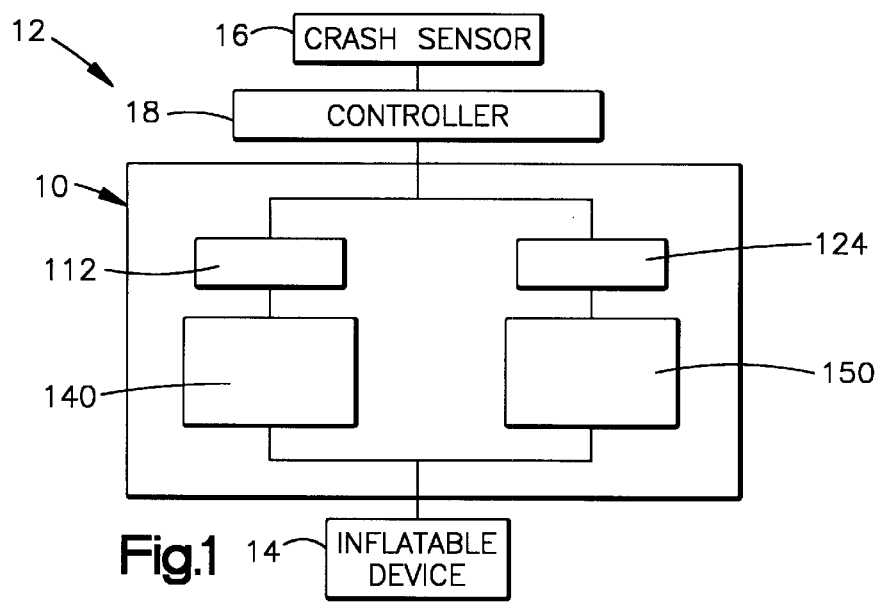
FIG. 1 is a schematic view of a vehicle occupant protection apparatus including an inflator constructed in accordance with a first embodiment of the present invention.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiment of the invention, the protection device 14 is an air bag for helping to protect a driver of a vehicle. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle, such as the vehicle steering wheel, as a result of a crash.

The apparatus 12 also includes a crash sensor 16. The crash sensor 16 is a known device which senses a vehicle condition that indicates the occurrence of a vehicle crash or a side impact to the vehicle or a rollover condition of the vehicle. If the vehicle condition sensed by the crash sensor 16 is at or above a first predetermined threshold level, it indicates the occurrence of a crash having a first predetermined threshold level of severity. The first threshold level of crash severity is a level at which inflation of the air bag 14 at a relatively low rate is desired for protection of a vehicle occupant. If the vehicle condition sensed by the crash sensor 16 is at or above a second predetermined threshold level, it indicates the occurrence of a crash having a second, higher, predetermined threshold level of severity. The second threshold level of crash severity is a level at which inflation of the air bag 14 at a relatively high rate is desired for protection of a vehicle occupant.

The vehicle condition sensed by the crash sensor 16 preferably is sudden vehicle deceleration that is caused by a collision. The magnitude and duration of the deceleration are measured by the crash sensor 16. If the magnitude and duration of the deceleration meet or exceed predetermined threshold levels, they indicate the occurrence of a crash that meets or exceeds the predetermined threshold levels of crash severity. A suitable deployment signal is then transmitted to a controller 18 to indicate the occurrence of such a crash. The controller 18 sends an actuation signal to the inflator 10 to actuate the inflator.

Figure 3:
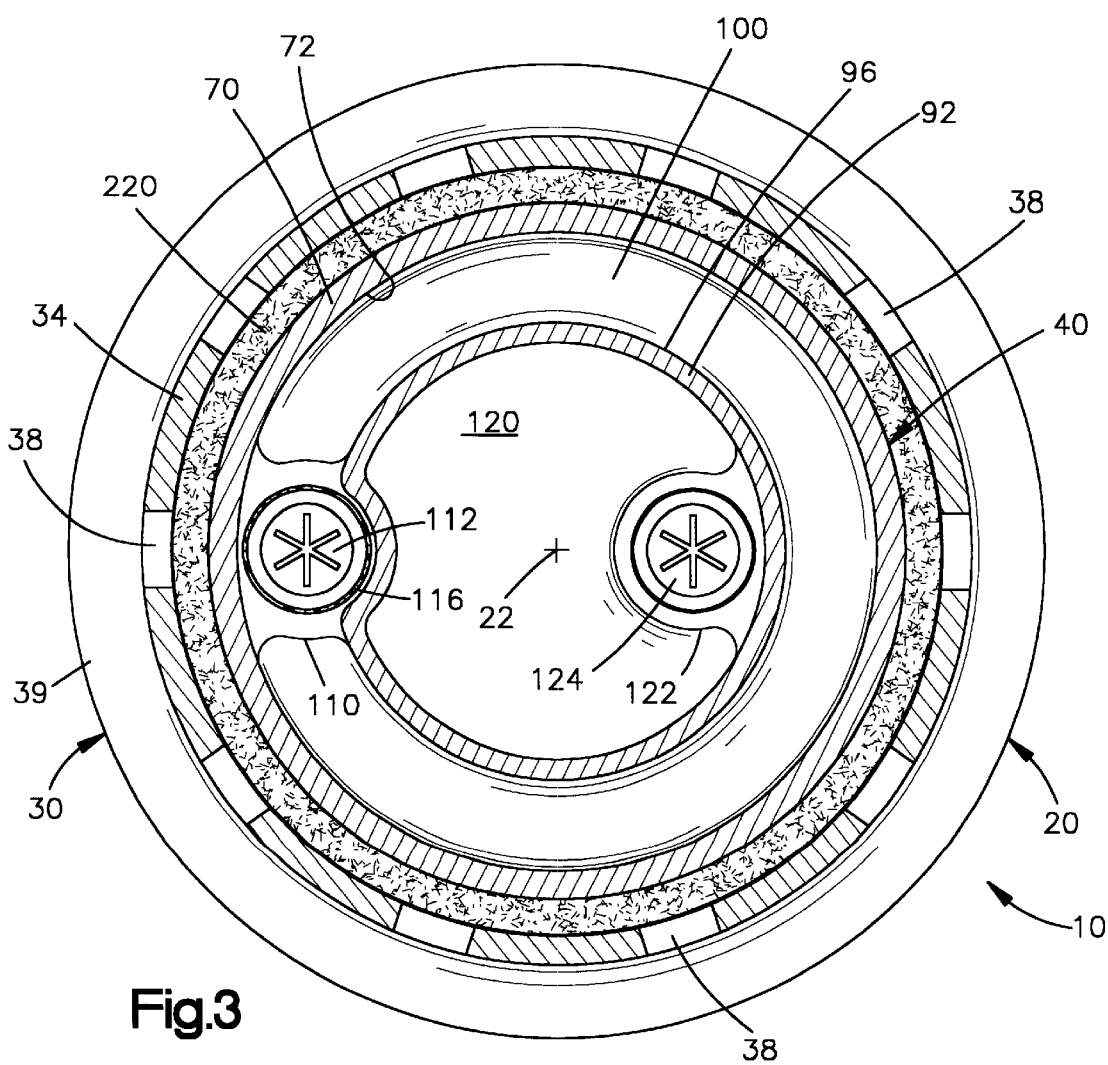
FIG. 3 is a radial sectional view showing the inflator of FIG. 1 in an unactuated condition.
Figure 4:
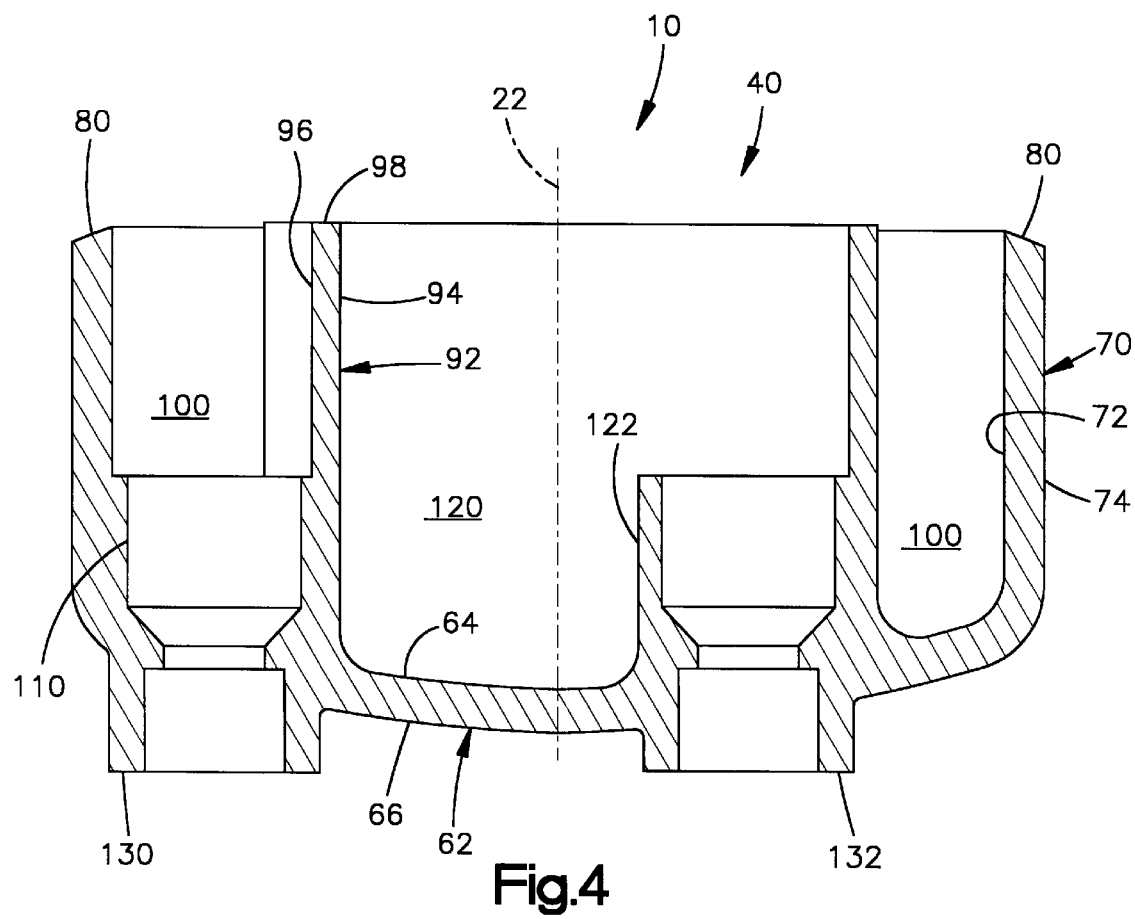
FIG. 4 is a sectional view of an igniter housing which forms a part of the inflator of FIG. 1.

The inflator 10 (FIGS. 2–4) includes a generally cylindrical housing or shell 20. The inflator 10 has a circular configuration as viewed from above in FIG. 2. The housing 20 includes a first or upper (as viewed in FIG. 2) housing part 30, referred to herein as a diffuser, a second or lower (as viewed in FIG. 2) housing part 40, referred to herein as an igniter housing, and a closure 50.

The diffuser 30 has an inverted, cup-shaped configuration centered on an axis 22 of the inflator 10. The diffuser 30 includes a radially extending end wall 32 and an axially extending side wall 34. The end wall 32 of the diffuser 30 is domed, that is, has a curved configuration projecting away from the closure 50. The end wall 32 has an inner side surface 36.

The side wall 34 of the diffuser 30 has a cylindrical configuration centered on the axis 22 of the inflator 10. A plurality of inflation fluid outlets 38 are disposed in a circular array on the side wall 34. Each one of the inflation fluid outlets 38 extends radially through the side wall 34. The outlets 38 enable flow of inflation fluid out of the inflator 10 to inflate the air bag 14. The outlets 38, as a group, have a fixed, predetermined flow area. An annular inflator mounting flange 39 extends radially outward from the side wall 34 at a location below (as viewed in FIG. 2) the inflation fluid outlets 38.

The closure 50 (FIG. 2) has a cup-shaped configuration including a radially extending end wall 52 and an axially extending side wall 54. The end wall 52 of the closure 50 is domed, that is, has a curved configuration projecting away from the diffuser 30. The end wall 52 has an inner side surface 56 presented toward the end wall 32 of the diffuser 30. Two circular openings 57 and 58 are formed in the end wall 52 of the closure 50. Neither one of the openings 57 and 58 is centered on the axis 22.

Figure 2:
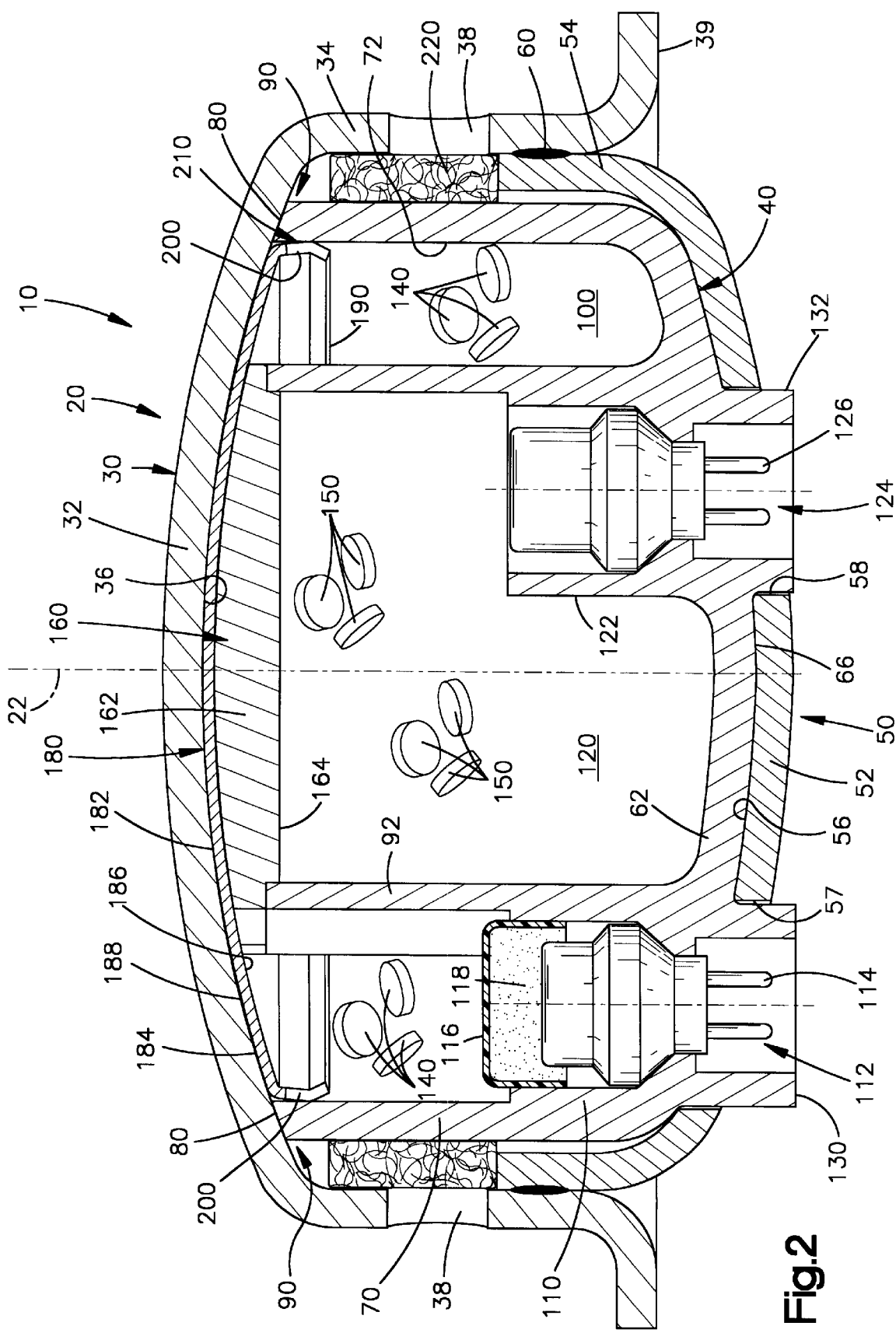
FIG. 2 is an axial sectional view showing the inflator of FIG. 1 in an unactuated condition.

The side wall 54 of the closure 50 has a cylindrical configuration centered on the axis 22. The outer diameter of the side wall 54 of the closure 50 is approximately equal to the inner diameter of the side wall 34 of the diffuser 30. The closure 50 is nested inside the diffuser 30, as seen in FIG. 2. The side wall 54 of the closure 50 is welded to the side wall 34 of the diffuser 30 with a single, continuous weld 60.

The igniter housing 40 (FIGS. 2 and 4) is impact extruded as one piece from aluminum or stainless steel. The igniter housing has a radially extending lower end wall 62. The end wall 62 has an inner side surface 64 (FIG. 4) which is presented toward the diffuser 30. The lower end wall 62 has an outer side surface 66 which is in abutting engagement with the inner side surface 56 of the end wall 52 of the closure 50.

The igniter housing 40 has a generally cylindrical outer side wall 70 which extends parallel to and is centered on the axis 22. The outer wall 70 has opposite inner and outer side surfaces 72 and 74. The outer side wall 70 has a ring-shaped upper end surface 80. The upper end surface 80 has a generally frustoconical configuration which seals against the inner side surface 36 of the end wall 32 of the diffuser 30. The axial length of the outer side wall 70 of the igniter housing 40 is selected so that the igniter housing is trapped or captured axially between the diffuser 30 and the closure 50 when the diffuser and the closure are welded together.

The upper end surface 80 of the igniter housing side wall 70 and the inner side surface 36 of the diffuser 30 define a fluid passage 90 (FIGS. 2, 5 and 6) in the inflator 10. Because the igniter housing side wall 70 is cylindrical, the fluid passage 90 has an annular configuration extending around and centered on the axis 22. The fluid passage 90 is located near the fluid outlets 38. The fluid passage 90, which is normally closed, opens upon actuation of the inflator 10 as described below.

The igniter housing 40 has a generally cylindrical inner side wall 92 spaced radially inward from the outer side wall 70. The inner side wall 92 extends parallel to and is centered on the axis 22. The inner side wall 92 has opposite inner and outer side surfaces 94 and 96 and an annular upper end surface 98.

A ring-shaped primary propellant chamber or combustion chamber 100 (FIG. 2) is defined inside the igniter housing 40. The radially outer boundary of the primary propellant chamber 100 is the inner side surface 72 of the outer side wall 70 of the igniter housing 40. The radially inner boundary of the primary propellant chamber 100 is the outer side surface 96 of the inner side wall 92 of the igniter housing 40. The primary propellant chamber 100 is centered on the axis 22.

A primary initiator wall 110 of the igniter housing 40 is disposed in the primary propellant chamber 100. The primary initiator wall 110 projects axially from the inner side surface 64 of the end wall 62 of the igniter housing 40. A primary initiator 112 is mounted in the primary initiator wall 110. The primary initiator 112 is a known device which is electrically actuatable by an electric current applied through terminals 114 to generate combustion products.

A retainer sleeve (not shown) is press fit between the primary initiator 112 and the wall 110 to secure the primary initiator in position in the igniter housing 100. A primary ignition cap 116 (FIGS. 2 and 3) press fitted in the wall 110 holds a quantity of primary ignition material 118, such as boron potassium nitrate, in contact with the primary initiator 112.

The inner side wall 92 of the igniter housing 40 defines a secondary propellant chamber 120 radially inward of the inner side wall. The secondary propellant chamber 120 has a generally cylindrical configuration centered on the axis 22.

A secondary initiator wall 122 of the igniter housing 40 is disposed in the secondary propellant chamber 120. The secondary initiator wall 122 projects axially from the inner side surface 64 of the end wall 62 of the igniter housing 40. The secondary initiator wall 122 is not centered on the axis 22. A secondary initiator 124 is mounted in the secondary initiator wall 122. The secondary initiator 124 is a known device which is electrically actuatable by an electric current applied through terminals 126 to generate combustion products. A retainer sleeve (not shown) is press fit between the secondary initiator 124 and the wall 122 to secure the secondary initiator in position in the igniter housing 40.

A cylindrical boss 130 of the igniter housing extends into the circular opening 57 in the end wall 52 (FIG. 2) of the closure 50. Another cylindrical boss 132 of the igniter housing 40 extends into the other circular opening 58 in the end wall 52 of the closure 50.

The inflator 10 includes a first actuatable inflation fluid source 140 in the form of a solid propellant. The propellant 140 is located in the primary combustion chamber 100. The propellant 140 is a known material which is ignitable by the combustion products of the primary ignition material 118 and which, when ignited, produces inflation fluid in the form of gas under pressure for inflating the air bag 14. The propellant 140 may be provided in the form of a plurality of discs filling or substantially filling the primary propellant chamber 100, or in the form of small pellets or tablets. The inflator 10 may include a combustor heat sink and a heat sink retainer (not shown) in the primary combustion chamber 100. The combustor heat sink can be made of knitted metal wire to help filter the inflation fluid produced by combustion of the primary propellant.

The inflator 10 includes a second actuatable inflation fluid source 150 in the form of a solid propellant. The secondary propellant 150 is located in the secondary propellant chamber 120. The secondary propellant 150 is a known material which is ignitable by the secondary initiator 124 and which, when ignited, produces inflation fluid in the form of gas under pressure for inflating the air bag 14. The secondary propellant 150 may be made from the same material as the primary propellant 140.

A secondary cap 160 closes the upper end of the secondary propellant chamber 120 in the igniter housing 40. The secondary cap 160 has a radially extending main body portion 162. An axially extending plug portion 164 of the secondary cap 160 fits inside the inner side wall 92 of the igniter housing 40 to hold the secondary cap in place on the igniter housing. The secondary cap 160 may alternatively have a plurality of tabs which fit inside the inner side wall 92. The secondary cap 160 contains the secondary propellant 150 in the secondary propellant chamber 120.

The inflator 10 includes a fluid flow control member in the form of a threshold cap 180. The threshold cap 180 is located axially between the secondary cap 160 and the diffuser 30. The threshold cap 180 is made from stamped sheet metal, substantially thinner than the housing parts 30, 40 and 50.

The threshold cap 180 (FIGS. 5 and 6) is shaped generally like a throwing disc and has a domed main body portion or central wall 182 centered on the axis 22. The central wall 182 has a circular configuration including an annular outer edge portion 184. The central wall 182 has parallel inner and outer side surfaces 186 and 188.

An annular side wall 190 of the threshold cap 180 extends generally axially from the central wall 182. The side wall 190 of the threshold cap 180 includes a first portion 192 which is connected with and extends from the outer edge portion 184 of the central wall 182 of the threshold cap. The first portion 192 has a slightly frustoconical configuration, extending radially outward from the central wall 182 as it extends axially away from the central wall 182. In the illustrated embodiment, the first portion 192 of the side wall 190 extends at a small angle (about 5 degrees) to the axis 22. A second portion 194 of the side wall 190 of the threshold cap 180 extends axially downward and radially inward from the first portion 192.

The threshold cap 180 has a plurality of openings in the form of slots 200. The slots 200 extend between inner and outer side surfaces 196 and 198 of the side wall 190 of the threshold cap 180. The slots 200 are spaced apart equally along the side wall 190, in a circular array centered on the axis 22. Each one of the slots 200 has a respective upper edge 202.

The slots 200 in the threshold cap 180 together form a fluid flow control passage 210 in the threshold cap. In the illustrated embodiment, the threshold cap 180 has six slots 200. A greater or lesser number of slots 200 may be provided to obtain the desired flow control characteristics of the inflator 10.

The threshold cap 180 (FIG. 2) is disposed in the inflator 10, at a location centered on the axis 22. The inner side surface 186 of the central wall 182 of the threshold cap 180 is in abutting engagement with the main body portion 162 of the secondary cap 160. The outer side surface 188 of the central wall 182 of the threshold cap 180 is in abutting engagement with the inner side surface 36 of the central wall 32 of the diffuser 30. The threshold cap 180 extends across both the primary combustion chamber 100 and the secondary combustion chamber 120 of the inflator 10. The side wall 190 of the threshold cap 180 is in abutting engagement with the inner side surface 72 of the outer side wall 70 of the igniter housing 40, near the fluid passage 90.

Prior to actuation of the inflator 10, the end surface 80 of the outer side wall 70 of the igniter housing 40 seals against the inner side surface 36 of the diffuser end wall 32, so that the fluid passage 90 is closed and has zero flow area. The closed fluid passage 90 blocks fluid flow between the primary combustion chamber 100 and the fluid outlets 38, prior to actuation of the inflator 10. There is no other path for any significant amount of fluid to flow between the primary inflation fluid source 140 and the fluid outlets 38. Upon actuation of the inflator 10, as described below, the fluid passage 90 opens to enable inflation fluid to flow between the inflation fluid source 140 and the fluid outlets 38. The fluid passage 90, when open, has a smaller flow area than the fluid outlets 38 in the diffuser 30.

Prior to actuation of the inflator 10, the control passage 210 in the threshold cap 180 is also in a closed condition. The slots 200 in the threshold cap 180 are substantially, if not completely, covered by the outer side wall 70 of the igniter housing 40. There is initially no significant gap between the side wall 190 of the threshold cap 180 and the outer side wall 70 of the igniter housing 40. The threshold cap 190 substantially blocks fluid flow between the primary combustion chamber 100 and the fluid passage 90. Upon actuation of the inflator 10, as described below, the threshold cap 190 moves and deforms to enable inflation fluid to flow through the slots 200.

In the event of a vehicle crash at or above the first predetermined threshold level of crash severity, but below the second predetermined threshold level of crash severity, an electric signal is applied to only the terminals 114 of the primary initiator 112. The primary initiator 112 is actuated and ignites the primary ignition material 118. The force of the combustion products of the primary ignition material 118 ruptures the igniter cap 116.

The combustion products of the primary ignition material 118 ignite the primary propellant 140. The primary propellant 140 combusts and produces inflation fluid under pressure in the primary propellant chamber 100. The pressure in the primary propellant chamber 100 rises rapidly to a pressure in the range of about 4,000 psi to about 5,000 psi or more.

The secondary cap 160 during this time blocks flow of combustion products from the primary propellant chamber 100 (which surrounds the secondary cap) into the secondary propellant chamber 120. This prevents ignition of the secondary propellant 150 when the primary initiator 112 is actuated but the secondary initiator 124 is not actuated.

The material thickness of the housing 20 is selected so that the end walls 32 and 52 deform because of the pressure of inflation fluid in the housing upon actuation of the primary inflation fluid source 140. Specifically, the end wall 32 of the diffuser 30 deforms axially outward (in an upward direction as viewed in FIG. 2), from the condition shown in FIG. 2 to the condition shown in FIG. 7. Simultaneously, the end wall 52 of the closure 50 deforms axially outward in the opposite direction. The amount of deformation or deflection of the end walls 32 and 52 is dependent on the pressure in the housing 20. That is, the higher the pressure in the housing 20, the more the end walls 32 and 52 deflect outward.

The pressure of the inflation fluid in the primary propellant chamber 100 forces the igniter housing 40 against the end wall 52 of the closure 50. As the diffuser 30 and the closure 50 move away from each other, the fluid pressure on the inner side surface 186 of the threshold cap 180 causes the threshold cap to move with the diffuser, away from the closure and the igniter housing 40. The movement of the threshold cap 180 exposes the slots 200 and opens the control passage 210, as described below, to enable inflation fluid to flow out of the primary propellant chamber 100 through the fluid passage 90.

The upper end surface 80 of the outer side wall 70 of the igniter housing 40 moves away from the inner side surface 36 of the end wall 32 of the diffuser 30. The fluid passage 90 opens and its flow area increases, because of the deformation of the housing 20. The inflation fluid flows out of the primary propellant chamber 100, through the slots 200 in the threshold cap 180, and toward the fluid passage 90. Inflation fluid flows through the fluid passage 90, through an annular final filter 220, and toward the inflation fluid outlets 38. Inflation fluid flows out of the primary propellant chamber 100 along the entire 360 degree extent of the fluid passage 90. The fluid outlets 38 direct the inflation fluid to flow out of the housing 20 to the inflatable device 14.

The flow area of the fluid passage 90 in the housing 20 varies in accordance with the pressure of inflation fluid in the housing 20. Specifically, the higher the pressure in the housing 20, the more the end walls 32 and 52 deflect or deform outward. The more the end walls 32 and 52 deflect outward, the more the end surface 80 of the igniter housing 40 moves away from the end wall of the diffuser 30, and the bigger the fluid passage 90 becomes. In one embodiment, the fluid passage 90 is typically about one-half millimeter in axial extent when the inflator 10 is actuated. Under extreme pressure conditions, the fluid passage 90 could have an axial extent of as much as two to three millimeters.

As the housing 20 deforms, the slots 200 in the threshold cap 180 progressively open, increasing the flow area of the control passage 210. At the same time, the fluid passage 90 between the diffuser 30 and the igniter housing progressively opens. Because the fluid passage 90 has a 360 degree circumferential extent and the slots 200 have a limited circumferential extent, the flow area of the fluid passage 90 increases more rapidly than the flow area of the control passage 304. Thus, the fluid flow area through the slots 200 in the threshold cap 180 almost immediately becomes smaller than the fluid flow area through the fluid passage 90 between the igniter housing 40 and the diffuser 30. Thus, the threshold cap 180 acts as a restrictor, or control, for the rate of fluid flow out of the inflator 10.

The flow area of the slots 200 in the threshold cap 180, which make up the control passage 210, varies in accordance with the pressure of inflation fluid in the housing 20. Specifically, the higher the pressure in the housing 20, the more the threshold cap 180 moves away from the igniter housing 40. As a result, a greater portion of each one of the slots 200 in the threshold cap 180 is exposed, and the control passage 210 becomes bigger.

Because the flow area of the control passage 210 varies in accordance with the pressure of inflation fluid in the housing 20, the internal operating pressure of the inflator 10 is self-regulating. Any increased pressure in the primary propellant chamber 100 causes the control passage 210 to open further, thus allowing the pressure to be relieved and lowered. The range of peak operating pressures in the inflator 10 is, therefore, narrowed, reducing the structural requirements of the inflator housing 20 accordingly.

Controlling fluid flow in this manner, that is, through movement of the slotted threshold cap 180, can be more precise than controlling fluid flow solely with the gap 90 caused by deformation of the housing 20. In addition, it is relatively easy to vary the fluid flow characteristics for different inflators, by providing different threshold caps 180 having different opening sizes or configurations.

Because the peak pressures in the primary propellant chamber 100 are reduced by the increased opening of the variable control passage 210, effects of temperature change on the pressure in the primary propellant chamber 100 are minimized. This can enable the use of a primary propellant 140 which is more pressure sensitive, that is, which has a higher burn rate exponent. In addition, with the secondary combustion chamber 120 being completely encircled by the primary combustion chamber 100, only the primary combustion chamber need be capable, itself, of sustaining the structural loads arising upon actuation of the inflator 10.

In the event of a vehicle crash at or above the second predetermined threshold level of crash severity, both the primary initiator 112 and the secondary initiator 124 are actuated. The actuation of the primary initiator 112 results in ignition of the primary propellant 140 as described above. Inflation fluid produced by the primary propellant 140 deforms the housing 20, moves the threshold cap 180, and flows out of the inflator 10 as described above.

The secondary initiator 124 is actuated by an electric signal applied to the terminals 126 of the secondary initiator. The secondary initiator 124 ignites the secondary propellant 150. The secondary propellant 150 produces combustion products which increase the pressure in the secondary combustion chamber 120. This increased pressure acts on the secondary cap 160 and causes the secondary cap to move out of engagement with the igniter housing 40, as shown in FIG. 8.

The combustion products of the secondary propellant 150 join with the combustion products of the primary propellant 140 in the primary combustion chamber 100. The resulting increase of pressure in the primary combustion chamber 100 causes the housing 20 to deform more than it does when only the primary propellant 140 is ignited. This increased deformation of the housing 20 allows more movement of the threshold cap 180 and thus, if desired, more exposure of the slots 200. The combined combustion products of the secondary propellant 150 and the primary propellant 140 flow through the slots 200 in the threshold cap 180 and thence out of the inflator 10 in the manner described above.

From the above description of the invention, those skilled in the art will perceive improvements, changes and modifications in the invention. Such improvements, changes and modifications within the skill of the art are intended to be covered by the appended claims.

What is claimed is:

1. An inflator for providing inflation fluid for inflating an inflatable vehicle occupant protection device, said inflator comprising:

a housing defining first and second combustion chambers;

a first inflation fluid source in said first combustion chamber and actuatable to effect flow of inflation fluid to inflate the inflatable device;

a first initiator in said housing for, when energized, effecting actuation of said first inflation fluid source;

a second inflation fluid source in said second combustion chamber and actuatable to effect flow of inflation fluid to inflate the inflatable device;

a second initiator in said housing for, when energized, effecting actuation of said second inflation fluid source;

said housing deforming due to the pressure of inflation fluid in said housing upon actuation of one or both of said inflation fluid sources;

said housing, after deforming, having a fluid passage for directing flow of inflation fluid out of said housing to the inflatable device, the flow area of said fluid passage varying in accordance with the pressure of inflation fluid in said housing;

said housing comprising first and second housing parts having a first condition in abutting engagement with each other and a second condition, after deformation of said housing, spaced apart from each other to define said fluid passage;

said first housing part comprising a one-piece metal member that supports said first and second initiators and defines said first and second combustion chambers.

2. An apparatus as set forth in claim 1 wherein said first and second housing parts are in said first condition prior to actuation of said inflation fluid sources and in said second condition upon actuation of one or both of said inflation fluid sources.

3. An apparatus as set forth in claim 1 further comprising a flow control member defining a control passage located between said inflation fluid source and said fluid passage, said control passage having a smaller flow area than said fluid passage, the flow area of said control passage increasing due to deformation of said housing and varying in accordance with the pressure of inflation fluid in said housing upon actuation of said inflation fluid source.

4. An apparatus as set forth in claim 3 wherein said control passage comprises a plurality of fluid flow control openings which move relative to said housing to increase their flow area upon deformation of said housing.

5. An apparatus as set forth in claim 3 wherein said flow control member is movable with said second housing part relative to said first housing part, upon actuation of said inflation fluid source, to move said control passage from a closed condition to an open condition.

6. An apparatus as set forth in claim 1 wherein said first combustion chamber has a generally ring-shaped configuration and extends completely around said second combustion chamber.

7. An inflator as set forth in claim 1 wherein said one-piece metal member includes a first portion for supporting said second initiator and defining a radially inner wall of said first combustion chamber, and a second portion defining a radially outer wall of said first combustion chamber.

8. An inflator as set forth in claim 7 wherein said one-piece member comprises a third portion joining said first and second portions and defining an axial end wall of said first combustion chamber.

9. An inflator as set forth in claim 7 wherein said second portion of said one-piece metal member is engageable with said second housing part when said housing parts are in the first condition.

10. An inflator as set forth in claim 7 wherein said radially inner wall of said first combustion chamber forms a radially outer wall of said second combustion chamber.

11. An inflator as set forth in claim 1 wherein said first housing part comprises an annular surface which is engageable with an inner major side surface of said second housing part when said housing parts are in the first condition.

12. An apparatus as set forth in claim 1 wherein said first and second combustion chambers are centered on a central axis of said inflator and said first and second initiators are not centered on said central axis.

* * * * *

UNITED STATES PATENT AND TRADEMARK OFFICE
CERTIFICATE OF CORRECTION

PATENT NO.    : 6,364,353 B2
DATED         : April 2, 2002
INVENTOR(S)   : Lloyd G. Green, Jr. et al.

It is certified that error appears in the above-identified patent and that said Letters Patent is hereby corrected as shown below:

<u>Column 8, line 59 through Column 10, line 35,</u>
Delete claim 1 through claim 12 and insert:

1. An inflator for providing inflation fluid for inflating an inflatable vehicle occupant protection device, said inflator comprising:

a housing defining first and second combustion chambers;

a first inflation fluid source in said first combustion chamber and actuatable to effect flow of inflation fluid to inflate the inflatable device;

a first initiator in said housing for, when energized, effecting actuation of said first inflation fluid source;

a second inflation fluid source in said second combustion chamber and actuatable to effect flow of inflation fluid to inflate the inflatable device;

a second initiator in said housing for, when energized, effecting actuation of said second inflation fluid source;

said housing deforming due to pressure of inflation fluid in said housing upon actuation of one or both of said inflation fluid sources;

said housing, after deforming, having a fluid passage for directing flow of inflation fluid out of said housing to the inflatable device, the flow area of said fluid passage varying in accordance with the pressure of inflation fluid in said housing;

said housing comprising first and second housing parts having a first condition in abutting engagement with each other and a second condition, after deformation of said housing, spaced apart from each other to define said fluid passage;

said first housing part comprising a one-piece metal member that supports said first and second initiators and defines said first and second combustion chambers;

wherein said first combustion chamber has a generally ring-shaped configuration and extends completely around said second combustion chamber.

UNITED STATES PATENT AND TRADEMARK OFFICE
CERTIFICATE OF CORRECTION

PATENT NO.    : 6,364,353 B2
DATED         : April 2, 2002
INVENTOR(S)   : Lloyd G. Green, Jr. et al.

It is certified that error appears in the above-identified patent and that said Letters Patent is hereby corrected as shown below:

2. An inflator for providing inflation fluid for inflating an inflatable vehicle occupant protection device, said inflator comprising:

a housing defining first and second combustion chambers;

a first inflation fluid source in said first combustion chamber and actuatable to effect flow of inflation fluid to inflate the inflatable device;

a first initiator in said housing for, when energized, effecting actuation of said first inflation fluid source;

a second inflation fluid source in said second combustion chamber and actuatable to effect flow of inflation fluid to inflate the inflatable device;

a second initiator in said housing for, when energized, effecting actuation of said second inflation fluid source;

said housing deforming due to pressure of inflation fluid in said housing upon actuation of one or both of said inflation fluid sources;

said housing, after deforming, having a fluid passage for directing flow of inflation fluid out of said housing to the inflatable device, the flow area of said fluid passage varying in accordance with the pressure of inflation fluid in said housing;

said housing comprising first and second housing parts having a first condition in abutting engagement with each other and a second condition, after deformation of said housing, spaced apart from each other to define said fluid passage;

said first housing part comprising a one-piece metal member that supports said first and second initiators and defines said first and second combustion chambers;

wherein said first and second combustion chambers are centered on a central axis of said inflator and said first and second initiators are not centered on said central axis.

UNITED STATES PATENT AND TRADEMARK OFFICE
CERTIFICATE OF CORRECTION

PATENT NO.   : 6,364,353 B2
DATED        : April 2, 2002
INVENTOR(S)  : Lloyd G. Green, Jr. et al.

It is certified that error appears in the above-identified patent and that said Letters Patent is hereby corrected as shown below:

3.  An inflator for providing inflation fluid for inflating an inflatable vehicle occupant protection device, said inflator comprising:

a housing defining first and second combustion chambers;

a first inflation fluid source in said first combustion chamber and actuatable to effect flow of inflation fluid to inflate the inflatable device;

a first initiator in said housing for, when energized, effecting actuation of said first inflation fluid source;

a second inflation fluid source in said second combustion chamber and actuatable to effect flow of inflation fluid to inflate the inflatable device;

a second initiator in said housing for, when energized, effecting actuation of said second inflation fluid source;

said housing deforming due to the pressure of inflation fluid in said housing upon actuation of one or both of said inflation fluid sources;

said housing, after deforming, having a fluid passage for directing flow of inflation fluid out of said housing to the inflatable device, the flow area of said fluid passage varying in accordance with the pressure of inflation fluid in said housing;

said housing comprising first and second housing parts having a first condition in abutting engagement with each other and a second condition, after deformation of said housing, spaced apart from each other to define said fluid passage;

said first housing part comprising a one-piece metal member that supports said first and second initiators and defines said first and second combustion chambers;

wherein said one-piece metal member includes a first boss and a second boss, said first boss being separated from said second boss, said first and second initiators including terminals for receiving an electric current, said first boss surrounding said terminals of said first initiator and said second boss surrounding said terminals of said second initiator.

UNITED STATES PATENT AND TRADEMARK OFFICE
CERTIFICATE OF CORRECTION

PATENT NO. : 6,364,353 B2
DATED : April 2, 2002
INVENTOR(S) : Lloyd G. Green, Jr. et al.

It is certified that error appears in the above-identified patent and that said Letters Patent is hereby corrected as shown below:

4. An apparatus as set forth in claim 3 wherein said first and second housing parts are in said first condition prior to actuation of said inflation fluid sources and in said second condition upon actuation of one or both of said inflation fluid sources.

5. An apparatus as set forth in claim 3 further comprising a flow control member defining a control passage located between said inflation fluid source and said fluid passage, said control passage having a smaller flow area than said fluid passage, the flow area of said control passage increasing due to deformation of said housing and varying in accordance with the pressure of inflation fluid in said housing upon actuation of said inflation fluid source.

6. An apparatus as set forth in claim 5 wherein said control passage comprises a plurality of fluid flow control openings which move relative to said housing to increase their flow area upon deformation of said housing.

7. An apparatus as set forth in claim 5 wherein said flow control member is movable with said second housing part relative to said first housing part, upon actuation of said inflation fluid source, to move said control passage from a closed condition to an open condition.

8. An inflator as set forth in claim 3 wherein said one-piece metal member includes a first portion for supporting said second initiator and defining a radially inner wall of said first combustion chamber, and a second portion defining a radially outer wall of said first combustion chamber.

9. An inflator as set forth in claim 8 wherein said one-piece metal member comprises a third portion joining said first and second portions and defining an axial end wall of said first combustion chamber.

UNITED STATES PATENT AND TRADEMARK OFFICE
CERTIFICATE OF CORRECTION

PATENT NO.   : 6,364,353 B2
DATED        : April 2, 2002
INVENTOR(S)  : Lloyd G. Green, Jr. et al.

It is certified that error appears in the above-identified patent and that said Letters Patent is hereby corrected as shown below:

10. An inflator as set forth in claim 8 wherein said second portion of said one-piece metal member is engageable with said second housing part when said housing parts are in said first condition.

11. An inflator as set forth in claim 8 wherein and said radially inner wall of said first combustion chamber forms a radially outer wall of said second combustion chamber.

12. An inflator as set forth in claim 3 wherein said first housing part comprises an annular surface which is engageable with an inner major side surface of said second housing part when said housing parts are in said first condition.

13. An apparatus as set forth in claim 3 wherein said first initiator projects into said first combustion chamber and wherein said second initiator projects into said second combustion chamber.

Signed and Sealed this

Sixth Day of May, 2003

JAMES E. ROGAN
*Director of the United States Patent and Trademark Office*